United States Patent
Pineda De Gyvez et al.

(10) Patent No.: US 7,256,645 B2
(45) Date of Patent: Aug. 14, 2007

(54) SUPPRESSION OF NOISE IN AN INTEGRATED CIRCUIT

(75) Inventors: Jose De Jesus Pineda De Gyvez, Eindhoven (NL); Rosario Capor, Catania (IT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/537,028

(22) PCT Filed: Oct. 31, 2003

(86) PCT No.: PCT/IB03/04940

§ 371 (c)(1),
(2), (4) Date: May 31, 2005

(87) PCT Pub. No.: WO2004/049605

PCT Pub. Date: Jun. 10, 2004

(65) Prior Publication Data

US 2006/0091941 A1    May 4, 2006

(30) Foreign Application Priority Data

Nov. 28, 2002    (EP) .................................. 02079978

(51) Int. Cl.
*H03K 5/00* (2006.01)
(52) U.S. Cl. ...................................... 327/551; 327/552
(58) Field of Classification Search ........ 327/551–559, 327/34
See application file for complete search history.

(56) References Cited

U.S. PATENT DOCUMENTS 4,344,150 A * 8/1982 McLaughlin ................. 708/310
5,406,552 A * 4/1995 Long et al. .................. 370/291
5,644,574 A * 7/1997 Wiley .......................... 370/276
5,841,308 A * 11/1998 Nagata ........................ 327/307
6,040,728 A    3/2000 Nelson et al.
6,958,642 B2 * 10/2005 Johnson et al. ............. 327/307

OTHER PUBLICATIONS

Liu T et al: "A negative feedback based substrate coupling noise reduction method", ASIC/SOC Conference, 1999. Proceedings. Twelfth Annual IEEE International Washington, DC, USA Sep. 15-18, 1999, Piscataway, NJ, USA, IEEE, US, pp. 49-53.

Chan H H Y et al: "Substrate coupled noise reduction and active noise suppression circuits for mixed-signal system-on-a-chip designs" Proceedings of the 44th. IEEE 2001 Midwest Symposium on Circuits and Systems. MWSCAS 2001. Dayton, OH, Aug. 14-17, 2001, Midwest Symposium on Circuits and Systems, New York, NY: IEEE, US, vol. 1 of 2, pp. 154-157.

* cited by examiner

*Primary Examiner*—Dinh T. Le

(57) ABSTRACT

Sub-circuits of an integrated circuit can act as noise sources on common conductors such as power supply lines and the substrate. Each of these conductors may act as a noise medium capable of transferring noise signals from the noise source to other sub-circuits. One or more feedback circuits are coupled between input and output points on opposite sides of where a circuit to be protected is connected to such a medium, so that a output of the feedback circuit is coupled to the noise medium closer to certain noise sources than the input of the feedback circuit. Preferably, multiple feedback circuits are cross-coupled and have transfer connections so that coupling between the input and outputs of different feedback circuit is at least partially suppressed.

4 Claims, 4 Drawing Sheets

SUPPRESSION OF NOISE IN AN INTEGRATED CIRCUIT

The invention relates to an electronic integrated circuit and more in particular to the suppression of interference noise in such a circuit.

From U.S. Pat. No. 6,040,728 it is known to reduce noise in an integrated circuit by means of injection of noise-canceling signals. In an integrated circuit many different sub-circuits are combined on the same substrate. Apart from the intended signals, each sub-circuit generates undesired signals, termed noise, in the substrate. The substrate acts as a noise medium which permits the noise from one sub-circuit to affect other sub-circuits in undesirable ways. Thus, sub-circuits also act as noise-sources. Noise that reaches analog circuits from digital circuits, for example, leads to deterioration of the signal-to-noise ratio of the analog circuits.

U.S. Pat. No. 6,040,728 teaches how a "quiet" region can be realized in the substrate of an integrated circuit, where sensitive analog circuits are present on the substrate (which acts as a noise medium). For this purpose a plurality of feedback circuits are provided in an array along the boundary of the quiet region. Each feedback circuit regulates the voltage in the substrate at a respective point along the boundary of the quiet region, so that the local voltage equals a "quiet" reference voltage. To regulate the local voltage, the feedback circuit senses a noise affected signal at the respective point and feeds back current that is negatively proportional to the difference between the local voltage and the reference voltage.

Thus, the noise signal is reduced at least locally and it may be expected that within the region surrounded by the respective point the noise is reduced as well. This technique requires a large number of feedback circuits. Even so, noise inside the region is reduced only partially when the spatial variation of the effect of the injected counter-noise as a function of position away from the point of injection is not the same as that of the noise. This is the case in particular for noise generated inside the region.

Amongst others, it is an object of the present invention to improve noise suppression when the noise to be suppressed has a spatially varying strength, and in particular when the noise source is located within a region where noise should be suppressed.

Amongst others, it is a further object of the present invention to reduce noise over a larger region using multiple non-local feedback circuits, while reducing a tendency towards local feedback effects.

Spatially varying noise from noise sources can be suppressed better by using non-local feedback, that is, a feedback wherein the noise source and an injection point of the feedback are coupled to a noise medium on a first side of the sub-circuit that is to be protected against noise and an input of the feedback is connected to the noise medium on a second side of the sub-circuit, the second side being opposite the first side. Such non-local feedback may be applied for example to suppress the effect of power supply bounce propagation on a noise medium like a power supply line in the integrated circuit, or substrate noise propagation across a digital-analog boundary in substrate of the integrated circuit, by using a feedback circuit with an input and an injection point coupled to the power supply line at positions removed from one another, so that at least some protected sub-circuits are connected to the power supply line between the input and the injection point. Thus, the input is in a region of the medium relatively far away from the injection point and the noise source. In such a region the spatial variation of the effect of the injection point and the noise source is less strongly dependent on position, or both effects may even depend congruously on position. Therefore cancellation of the noise source and the injection occurs over a large region. Cancellation is not strongly localized, as in the case of local feedback, because with local feedback the effect of injection and the effect of the noise source around the input depend on position in a different way since the input is near the injection point and the noise source is not.

The use of non-local feedback may have the disadvantage that there is a detrimental effect on the noise from noise sources in regions away from the region where noise is suppressed, for example when the noise source is opposite the injection point, as seen from the input of the feedback circuit. To suppress noise from sources in more than one direction, it would be desirable to inject different counter-noise at more than one location, using different feedback circuits. However, when multiple feedback circuits are combined with non-local feedback it may be the case that the point where one feedback circuit senses noise is close to the point where another feedback loop injects noise and vice versa. Thus an overall feedback loop is created which includes both feedback loops. Such an overall feedback loop suppresses noise locally at an input by injection of counter-noise close to the input, thus undoing the advantages of non-local feedback.

In an embodiment the integrated circuit comprises a further noise source coupled to the noise medium and a further non-local feedback circuit with input and output coupled to the noise medium, the inputs of the non-local feedback circuit and the further non-local feedback circuit being differential inputs, the differential inputs of the non-local feedback circuit being coupled to the noise medium on mutually opposite sides of the further noise source, the differential inputs of the further non-local feedback circuit being coupled to the noise medium on mutually opposite sides of the noise source. It has been found that noise is reduced in this way. A tentative explanation is that this spatial feedback attempts to equalize the feedback signal at its two end points and as such attenuates the noise magnitude comprised within the loop. As a result the contribution of the noise from these sources to overall feedback effects is reduced. This at least partly permits the operation of multiple non-local feedback circuits with non-local feedback effect.

In another embodiment the effect of local feedback is suppressed by using a further non-local feedback circuit, with input and output coupled to the noise medium, so that an output of the non-local feedback circuit is coupled to the noise medium closer to the input of the further non-local feedback circuit than to the input of the non-local feedback circuit, the output of the non-local feedback circuit and the input of the further non-local feedback circuit being mutually arranged so that transfer of output signals from the output of the non-local feedback circuit to signal components fed back by the further non-local feedback circuit are at least partially suppressed. Thus, it is ensured that noise canceling extends over relatively large regions, by forcing compensation of the noise in each region by injection relatively remote from that region. Suppression masks inputs and outputs from one another. Masking may be realized for example by providing the feedback circuits with differential inputs coupled to the medium, the feedback circuits weighing signals from the inputs so that input signals from a nearby injection point substantially do not contribute to the feedback signal. As an alternative masking may be realized with differential output coupling weighted so as not to affect nearby inputs.

These and other objects and advantageous aspects of an integrated circuit according to the present invention will be described in more detail using the following figures.

FIG. 1 shows a circuit with noise compensation

FIG. 2a,b show noise amplitudes as a function of position along a noise medium

Figure 1:
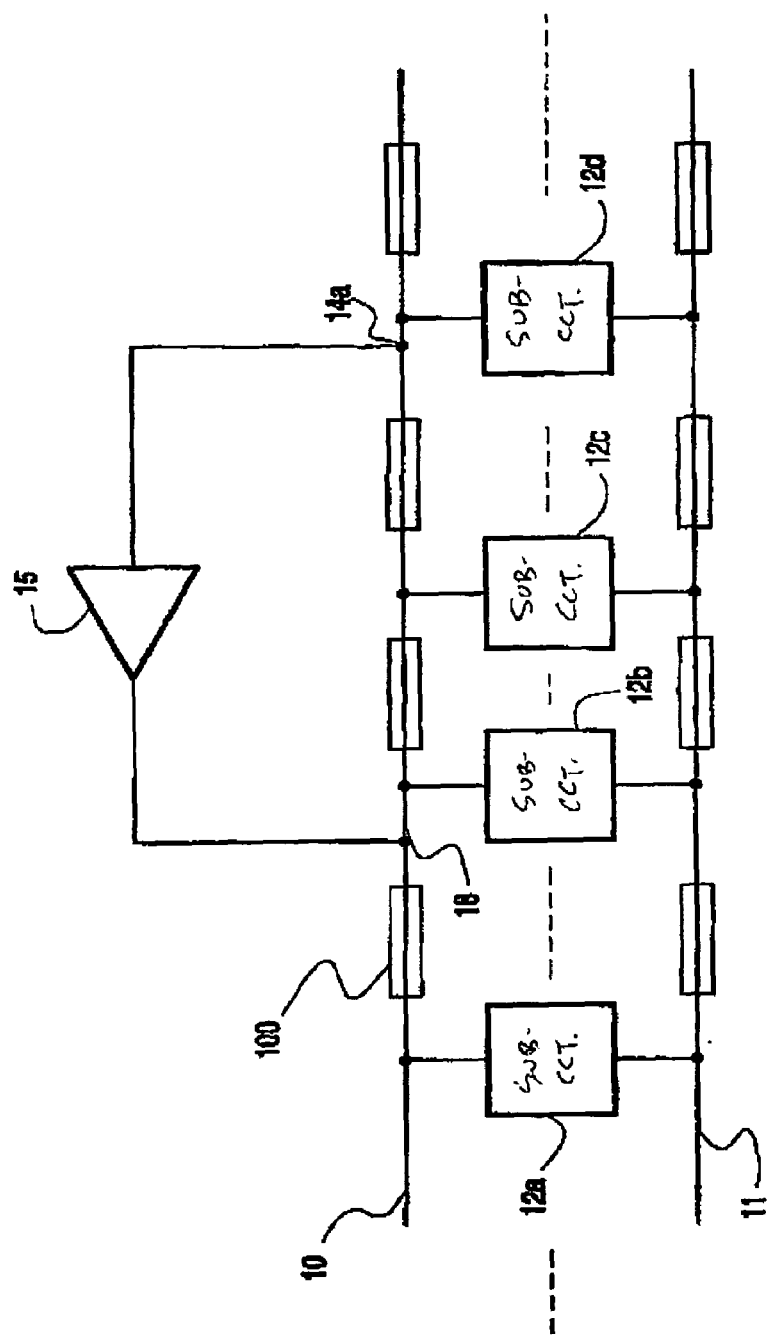

FIG. 1 shows a circuit with a first power supply conductor 10 and a second power supply conductor 11 between which a number of sub-circuits is connected (only four sub-circuits 12a-c shown). A feedback circuit is provided, comprising a feedback inverting-amplifier 15. Feedback amplifier 15 has an input coupled to an input point 14a on first power supply conductor 10 and an output coupled to an output point 18 remote from the input point 14a. Power supply conductors 10, 11 act as media for transmission of signals, i.e. the voltages at different points along these conductors may be mutually different due to propagation effects, for example due to RC filter-like behavior or propagation delay. To emphasize the transmission medium like nature of power supply conductors 10, 11 symbolic filters 100 (only one labeled) have been shown included in the power supply conductors.

In operation sub-circuits 12a-d draw power supply currents which flow between power supply conductors 10, 11. The power supply currents cause voltage fluctuations on the power supply conductors 10, 11. Through these voltage fluctuations, sub-circuits 12a-c may exert undesirable effects upon one another. These voltage fluctuations should be regarded as noise. Thus, power supply conductors 10, 11 act as noise media and sub-circuits 12a,b act as noise sources in this respect. Feedback amplifier 15 counteracts the effect of noise. Feedback amplifier 15 senses voltage fluctuations at input point 14a and injects a current that generates counteracting voltage fluctuations at output point 18. This generally requires that feedback amplifier 15 has a negative gain factor.

Figure 2A:
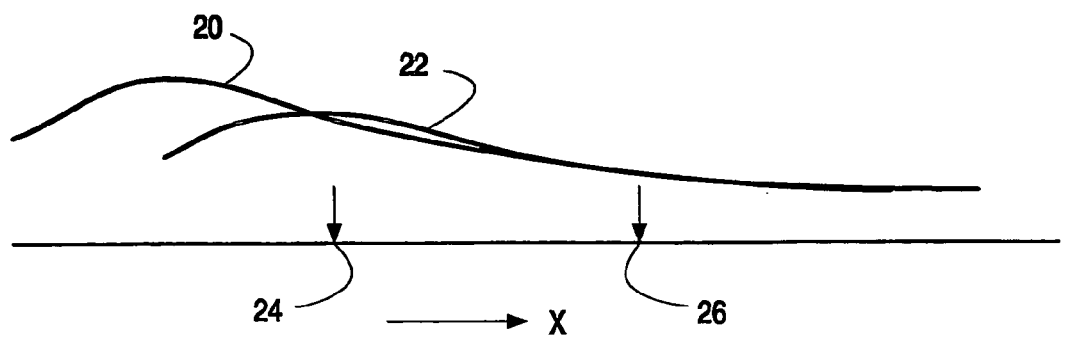

FIG. 2a schematically shows a first amplitude 20 of noise fluctuations caused by a first sub-circuit 12a as a function of position X along power supply line 10. (It will be understood that power supply conductor 10 may in fact follow a path with bends in it, in which case X represents distance traveled via the relevant path). FIG. 2a furthermore shows a second amplitude 22 of counteracting noise fluctuations introduced by feedback amplifier 15 in response to the noise fluctuations caused by first sub-circuit 12a (The actual counteracting noise fluctuations introduced by feedback amplifier 15 are the sum of the responses to the noise fluctuations due to different noise sources such as sub-circuits 12a-d. It will be understood that in practice only this sum is observable, not the individual responses to different sub-circuits 12a-d). The X position 24 of output point 18 and the X position 26 of input point 14a have been indicated.

Under ideal feedback conditions, fluctuations at the input point 14a (X position 26) due to first sub-circuit 12a have the same amplitude as fluctuations at that input point 14a due to the response by feedback amplifier 15, but are of opposite sign, so that the net noise at input point 14a (X position 26) is zero. In a relatively wide range of X positions around the X position 26 of input point 14a noise, where the X-positions are remote from both the location of first sub-circuit 12a and output point 18, the net noise is also low, because noise due to first sub-circuit 12a and counter noise due to feedback amplifier 15 have substantially the same X position dependence in this region.

Figure 2B:
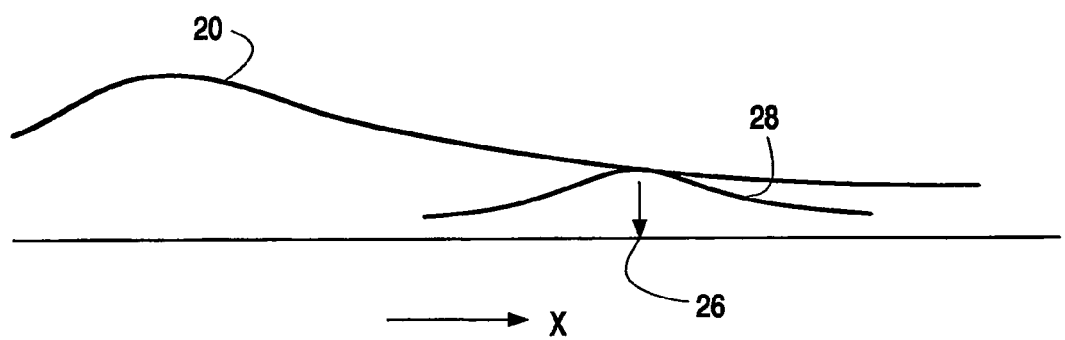

By way of contrast FIG. 2b shows the situation that would have arisen when the output of feedback amplifier 15 would have been coupled to power supply conductor 10 substantially at the location of input point 14a. In this case, the amplitude 28 of counter noise due to feedback amplifier 15 would generally be at a maximum at the X position 26 of the input point 18. Consequently, noise due to first sub-circuit 12a and counter noise due to feedback amplifier 15 have substantially dissimilar X position dependence around this position. Thus the net noise differs from zero only over a relatively narrow region.

Thus, by providing non-local feedback, with at an output point closer to the noise source 12a than the input point noise due to remote noise sources is cancelled over a relatively wide region where sub-circuits 12c-d are coupled to power supply conductor 10. A single feedback amplifier 15 suffices for the purpose of noise canceling when the only relevant noise source is remote in this sense. However, preferably a plurality of at least two feedback amplifiers is used when there are other noise sources.

Figure 3:
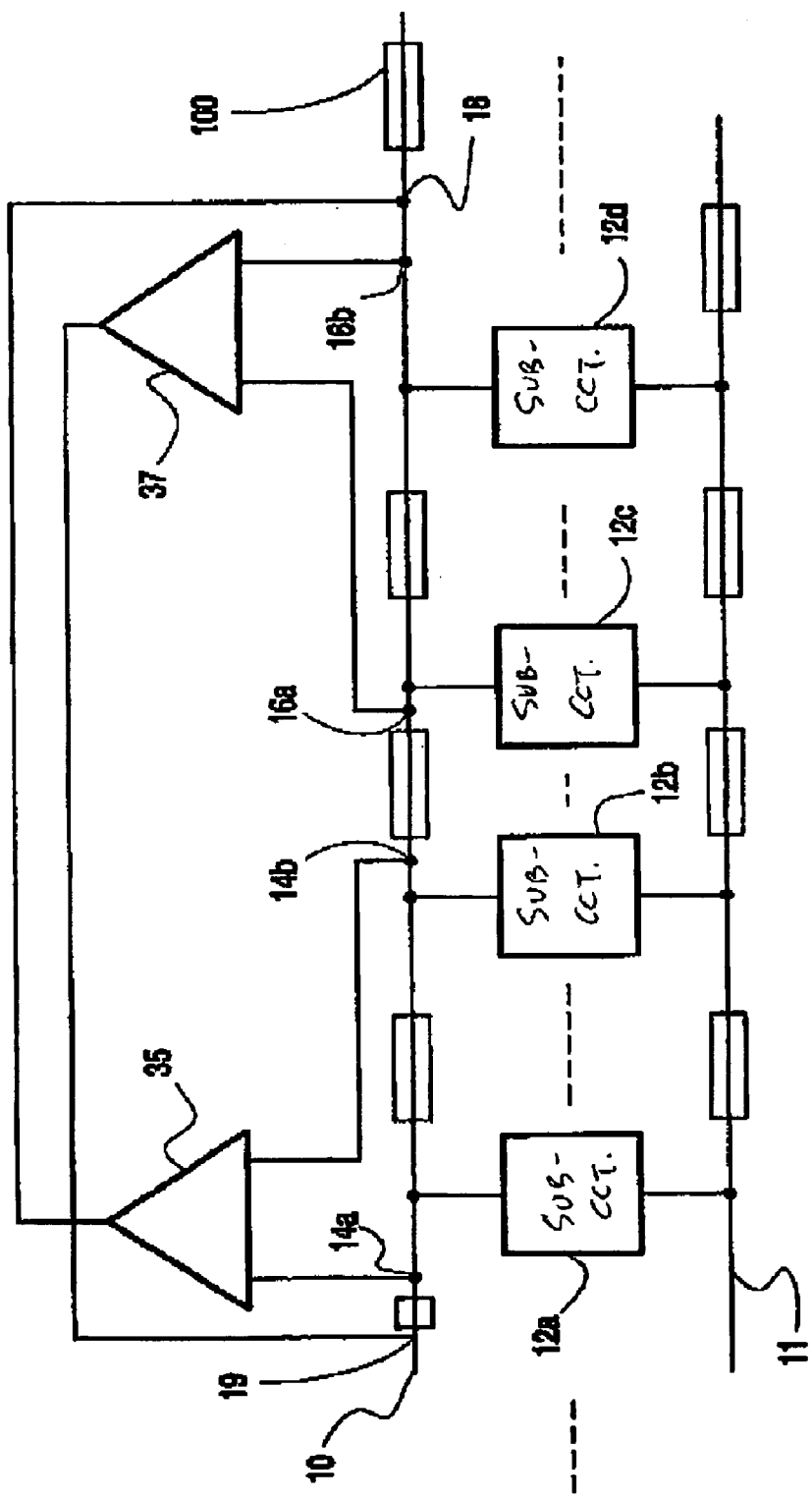
FIG. 3 shows an embodiment of a circuit with noise compensation

FIG. 3 shows a circuit according to the present invention wherein two feedback circuits are provided, each comprising a feedback amplifier 35, 37. A first feedback amplifier 35 has differential inputs coupled to input points 14a,b on first power supply conductor 10 and an output coupled to an output point 18 remote from the input points 14a,b. A second feedback amplifier 37 has differential inputs coupled to input points 16a,b on first power supply conductor 10 and an output coupled to an output point 19 remote from the input points 16a,b.

In operation, like amplifier 15 of FIG. 1, feedback amplifiers 35, 37 of FIG. 3 have the effect of suppressing noise on power supply conductor 10. (It will be understood that the word "feedback" is taken to imply that the sign of amplification by feedback amplifiers 35, 37 is so that an increase in the input signal leads to an output signal that counteracts the increase). Feedback amplifiers 35, 37 differentially sense noise voltage fluctuations on power supply conductor 10 between their respective input points 14a,b and 16a,b and introduce counteracting noise at their respective output locations 18 and 19. Noise from noise sources in a broader range of locations is suppressed than would otherwise be possible with a single feedback amplifier. Differential sensing reduces the effect of localization which may arise when the respective output point of one of the amplifiers 35, 37 is located near the respective input point of the other amplifier 37, 35 and vice versa. If feedback amplifiers 35, 37 both would have had single ended inputs (not differential inputs) near the output point of the other amplifier, the two amplifiers would have tended to cooperate as a single feedback loop, the output of each amplifier 35, 37 serving to suppress noise locally, each substantially as shown in FIG. 2b. As a result, this reduces the range of locations where noise is below a given threshold. It has been found that differential sensing reduces this effect, providing a broader range in which noise is below the threshold.

Figure 4:
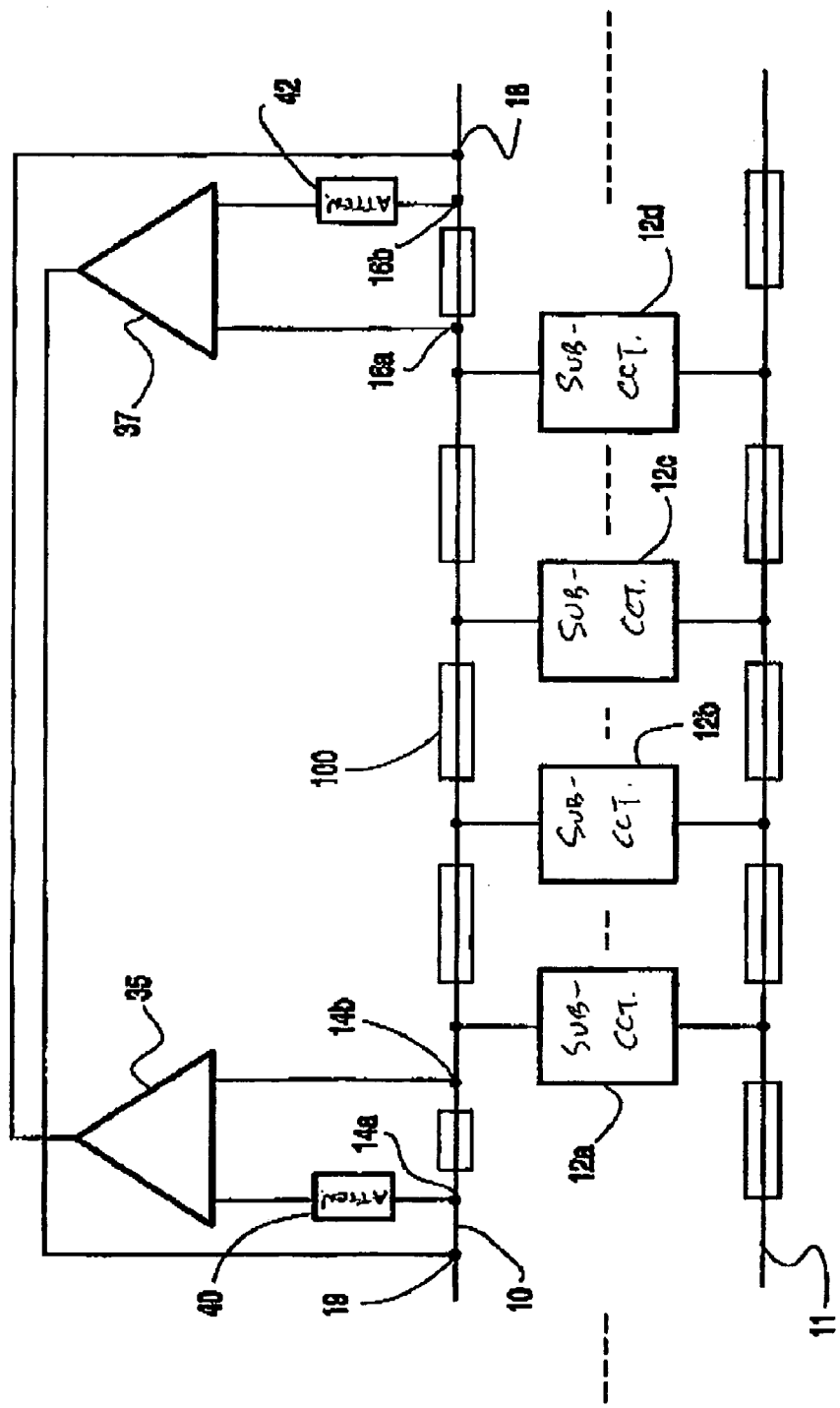
FIG. 4 shows a further embodiment of a circuit with noise compensation

FIG. 4 shows a further embodiment of a noise suppression circuit according to the present invention. (Here as well it will be understood that the word "feedback" is taken to imply that the sign of amplification by feedback amplifiers 35, 37 is so that an increase in the input signal leads to an output signal that counteracts the increase). In FIG. 4, single end gain factor adjustment circuits 40, 42 have been added at the inputs of differential amplifiers 35, 37. In operation single end gain factor adjustment circuits 40, 42 provide an adjustment of the sensitivity of the differential input of the differential amplifiers 35, 37, so that for each amplifier 35, 37 the respective output signal Y (not illustrated) of the amplifier 35, 37 depends on the respective voltages Va, Vb (not illustrated) at the input points 14*a,b*, 16*a,b* according to $$Y=g(Va-\alpha Vb)$$

The factor $\alpha$ is realized by the single end gain factor adjustment circuits 40, 42 and chosen so that counter noise introduced at an output point 19 near the input points 14*a,b* at which Va and Vb are sensed substantially has no effect on the output signal Y. That is, if the transfer factor of output signals Y from the nearby output point 19 to the input points 14*a,b* that sense Va and Vb are Ha and Hb respectively (not illustrated), the factor $\alpha$ equals Ha/Hb. When the single end gain factor adjustment circuits 40, 42 are applied to the input points 14*a*, 16*b* closest the nearest output points 18, 19, $\alpha$ usually represents an attenuation that can be realized by a simple circuit. Thus, the respective output signals Y of the amplifiers 35, 37 are made independent of each other. As a result the feedback amplifiers 35, 37 are forced to operate as separate feedback loops and the counter noise introduced at the output points serves to make Va–$\alpha$Vb zero, i.e. a signal indicative of the local noise except for the counter-noise introduced by the nearby output point 19.

Although the embodiment of FIG. 4 has been shown with a single the feedback has been described in terms of single end gain factor adjustment circuits 40, 42 coupled to specific inputs of amplifiers 35, 37, it will be understood that desensitizing of the inputs can in fact be realized by using gain factor adjustment at other inputs, or at both inputs. Also signals derived by weighing noise on more than two input points on power supply conductor 10 may be used. As an alternative, the outputs of the amplifiers 35, 37 may be arranged so that they generate substantially no input signal at a nearby input of another amplifier. This may be realized for example by using two outputs coupled to power supply conductor 10 with output signals of opposite sign, and an amplitude ratio, so that no net output signal results at the nearby input.

Although the invention has been illustrated for one power supply conductor 10, it will be understood that similar feedback arrangements may be applied to both power supply conductors 10, 11. The power supply conductors 10, 11 may be of linear shape, or be an essentially one dimensional structure running along a path with bends in it. In both cases noise can be suppressed effectively with a pair of amplifiers 35, 37. However, without deviating from the spirit of the present invention, power supply conductors 10, 11 may extend in two dimensions. In this case, however, more than two non-local feedback circuits are preferably used, with inputs and outputs distributed over a two dimensional region, always with measures to counteract that coupling between nearby inputs and outputs lead to localized noise compensation. Furthermore, the invention may of course be applied to noise media other than power supply lines, for example to semi-conductor substrates underneath sub-circuits 12*a-d*.

The invention claimed is:

1. An integrated circuit comprising a noise source, a sub-circuit, a noise medium capable of transferring noise signals from the noise source to the sub-circuit, a feedback circuit, having an input coupled to the noise medium at an input point on a first side of the sub-circuit and an output coupled to the noise medium at an output point on a second side of the sub-circuit, the first and second sides being opposite to one another relative to the sub-circuit, the noise source being coupled to the noise medium on said second side, comprising a further feedback circuit, with input and output coupled to the noise medium, so that an output of the feedback circuit is coupled to the noise medium closer to the input of the farther feedback circuit than to the input of the feedback circuit, the outout of the feedback circuit and the input of the further feedback circuit being mutually arranged so that undesired feedback of output signals from the output of the feedback circuit by the further feedback circuit is at least partially suppressed.

2. An integrated circuit according to claim 1, wherein said noise medium is a power supply line.

3. An integrated circuit according to claim 1, wherein the further feedback circuit has differential inputs and means for altering an amplitude of an input signal at at least one of the different inputs such that mutually different weights are applied to signals at the different inputs, the mutually different weights being so that said undesired feedback is at least partially suppressed.

4. An integrated circuit composing a noise source, a circuit, a noise medium capable of transferring noise signals from the noise source to the sub-circuit, a feedback circuit, having an input coupled to the noise medium at an input point on a first side of the sub-circuit and an output coupled to the noise medium at an output point on a second side of the sub-circuit, the first and second sides being opposite to one another relative to the sub-circuit, the noise source being coupled to the noise medium on said second side, comprising a further noise source coupled to the noise medium and a further feedback circuit with input and output coupled to the noise medium, the inputs of the feedback circuit and the further feedback circuit being differential inputs, the differential inputs of the feedback circuit being coupled to the noise medium on mutually opposite sides of the further noise source, the differential inputs of the further feedback circuit being coupled to the noise medium on mutually opposite sides of the noise source.

* * * * *